US012508822B2

(12) United States Patent
Riboni

(10) Patent No.: US 12,508,822 B2
(45) Date of Patent: Dec. 30, 2025

(54) DIGITAL INKJET PRINTING MACHINE FOR PRINTING ON CYLINDRICAL SUBSTRATES

(71) Applicant: QUANTIX DIGITAL S.r.l., Vigevano (IT)

(72) Inventor: Ivan Riboni, Vigevano (IT)

(73) Assignee: QUANTIX DIGITAL S.R.L, Vigevano (IT)

( * ) Notice: Subject to any disclaimer, the term of this patent is extended or adjusted under 35 U.S.C. 154(b) by 168 days.

(21) Appl. No.: 18/553,539

(22) PCT Filed: Mar. 28, 2022

(86) PCT No.: PCT/EP2022/058052
§ 371 (c)(1),
(2) Date: Sep. 29, 2023

(87) PCT Pub. No.: WO2022/207529
PCT Pub. Date: Oct. 6, 2022

(65) Prior Publication Data

US 2024/0190141 A1 Jun. 13, 2024

(30) Foreign Application Priority Data

Mar. 30, 2021 (IT) ........................ 102021000007904

(51) Int. Cl.
*B41J 3/407* (2006.01)
*B41J 25/00* (2006.01)
(Continued)

(52) U.S. Cl.
CPC ......... *B41J 3/40733* (2020.08); *B41J 3/4073* (2013.01); *B41J 25/001* (2013.01);
(Continued)

(58) Field of Classification Search
CPC .. B41J 3/40733; B41J 25/001; B41J 25/3088; B41J 25/316; B41J 2025/008; B41J 3/4073
See application file for complete search history.

(56) References Cited

U.S. PATENT DOCUMENTS

| | | | |
|---|---|---|---|
| 10,696,068 B2 | 6/2020 | Weber et al. | |
| 2016/0101631 A1 | 4/2016 | Dumenil et al. | |
| 2019/0111709 A1 * | 4/2019 | Weber ...................... | B41J 2/165 |

FOREIGN PATENT DOCUMENTS

| | | |
|---|---|---|
| EP | 3156242 A1 | 4/2017 |

OTHER PUBLICATIONS

International Search Report and Written Opinion dated Jun. 13, 2022, from corresponding International Application No. PCT/EP2022/058052.

* cited by examiner

*Primary Examiner* — Henok D Legesse
(74) *Attorney, Agent, or Firm* — Troutman Pepper Locke LLP

(57) ABSTRACT

Digital inkjet printing machine printing on cylindrical substrates, comprising a conveyor table conveying a cylindrical substrate and a printing station equipped with printheads having a parallel longitudinal axis. The table has a vertical rotation axis and supports a spindle supporting the cylindrical substrate. The spindle has an axis radially oriented with respect to the vertical rotation axis, and is actuatable in rotation about its axis. The conveyor table is configured to stop the spindle below the printheads, so the printheads have its axis parallel to the longitudinal axis of the printheads. The spindle axis stopped below the printheads belongs to main planes in which the printheads lie. The printheads are equidistant from the axis of the spindle. A first adjustment means adjusts the distance between the axis of the spindle
(Continued)

and the printheads and a second adjustment means adjusts the orientation of the main planes in which the printheads lie.

12 Claims, 6 Drawing Sheets

(51) Int. Cl.
*B41J 25/308* (2006.01)
*B41J 25/316* (2006.01)
(52) U.S. Cl.
CPC ......... *B41J 25/3088* (2013.01); *B41J 25/316* (2013.01); *B41J 2025/008* (2013.01)

DIGITAL INKJET PRINTING MACHINE FOR PRINTING ON CYLINDRICAL SUBSTRATES

CROSS-REFERENCE TO RELATED APPLICATIONS

The present application is a U.S. National Phase application under 35 U.S.C § 371 of International PCT/EP2022/058052 filed Mar. 28, 2022, which claims priority of Italian Patent Application No. 102021000007904 filed Mar. 30, 2021. The entire contents of which are hereby incorporated by reference.

FIELD OF THE INVENTION

The present invention relates to a digital inkjet printing machine for printing on cylindrical substrates.

BACKGROUND

One of the biggest challenges the printing machines on the market of the type described above must face is the ability to adapt to different formats of cylindrical substrates without penalizing productivity.

In some cases, the printing machines require the printheads to make several passes over the cylindrical substrate to deposit the ink of each individual color.

In this case the machines are well suited to printing on cylindrical substrates of different formats but can be penalized in terms of productivity and print quality.

With regard to print quality, adjustment defects can occur at the overlapping work areas of the printheads in successive passes over the cylindrical substrates.

Furthermore, applying ink at different times can result in an uneven drying of the ink, which can in turn cause printing defects.

Printing machines are also known in which the printheads pass only once over the cylindrical substrate to deposit the ink of each individual color.

In this case, the machines are more productive but do not always ensure repeatable results in terms of print quality, as the format of the cylindrical substrates changes due to inadequate adaptability.

Therefore, the technical task of the present invention is to provide a digital inkjet printing machine for printing on cylindrical substrates which allows to obviate the above-described technical drawbacks of the prior art.

Within the scope of this technical task, an object of the invention is to provide a digital inkjet printing machine for printing on cylindrical substrates which is highly productive and versatilely adaptable to print cylindrical substrates of different formats always with the same printing quality.

SUMMARY

The technical task, as well as these and other objects, according to the present invention are achieved by providing an inkjet digital printing machine for printing on cylindrical substrates, comprising a conveyor table of at least one cylindrical substrate and at least one printing station equipped with a series of printheads having a parallel longitudinal axis, wherein said table has a vertical rotation axis and supports at least one spindle for supporting said cylindrical substrate, wherein said spindle has an axis oriented radially with respect to said vertical rotation axis, wherein said spindle is actuatable in rotation about its axis, wherein said conveyor table is configured to stop said spindle below said printheads, wherein said spindle stopped below said printheads has its axis parallel to the longitudinal axis of said printheads, wherein said axis of said spindle stopped below said printheads belongs to main planes in which said printheads lie, wherein said printheads are equidistant from the axis of said spindle, wherein a first adjustment means for adjusting the distance between the spindle axis and said printheads is provided, and at least a second adjustment means for adjusting the orientation of said main planes in which said printheads lie is provided, said second adjustment means being configured to maintain the condition of the axis of the spindle stopped below said printheads of belonging to the main planes in which said printheads lie as the distance between said spindle axis and said printheads varies.

Advantageously, said printheads have a section of overlap in the direction of their longitudinal axis.

In a preferred embodiment of the invention, a fine adjustment means for finely adjusting the reciprocal position of the printheads is provided.

In a preferred embodiment of the invention, said fine adjustment means comprises first fine adjustment means for adjusting said section of overlap.

In a preferred embodiment of the invention said fine adjustment means comprises second fine adjustment means for adjusting the reciprocal alignment between the longitudinal axes of the printheads.

Other features of the present invention are further defined in the following claims.

A printing machine in accordance with the present invention is adapted to adjust the angular position of the printheads adapting it to the format of the cylindrical printing substrate.

In practice, each different value of the external diameter of the cylindrical printing substrate corresponds to a different inclination value of the main plane in which the printheads lie so that the spindle axis, which essentially coincides with the axis of the cylindrical substrate, is always contained in the main plane in which the printheads lie.

With this expedient it is possible, when varying the format of the cylindrical substrate, i.e., its external diameter, to maintain essentially the same distance between the printheads and the cylindrical substrate, essentially the same travel time and direction of impact of the ink droplets dispensed by the firing nozzles provided in the printheads, and consequently essentially the same print quality.

The special fine adjustment of the reciprocal position between the printheads further improves the print adjustment capability.

BRIEF DESCRIPTION OF THE DRAWINGS

Further features and advantages of the invention will become more apparent from the description of a preferred, but not exclusive, embodiment of the apparatus of the digital inkjet printing machine for printing on cylindrical substrates according to the invention, which is illustrated by way of approximate and non-limiting example in the attached drawings, of which.

DETAILED-DESCRIPTION

Figure 1:
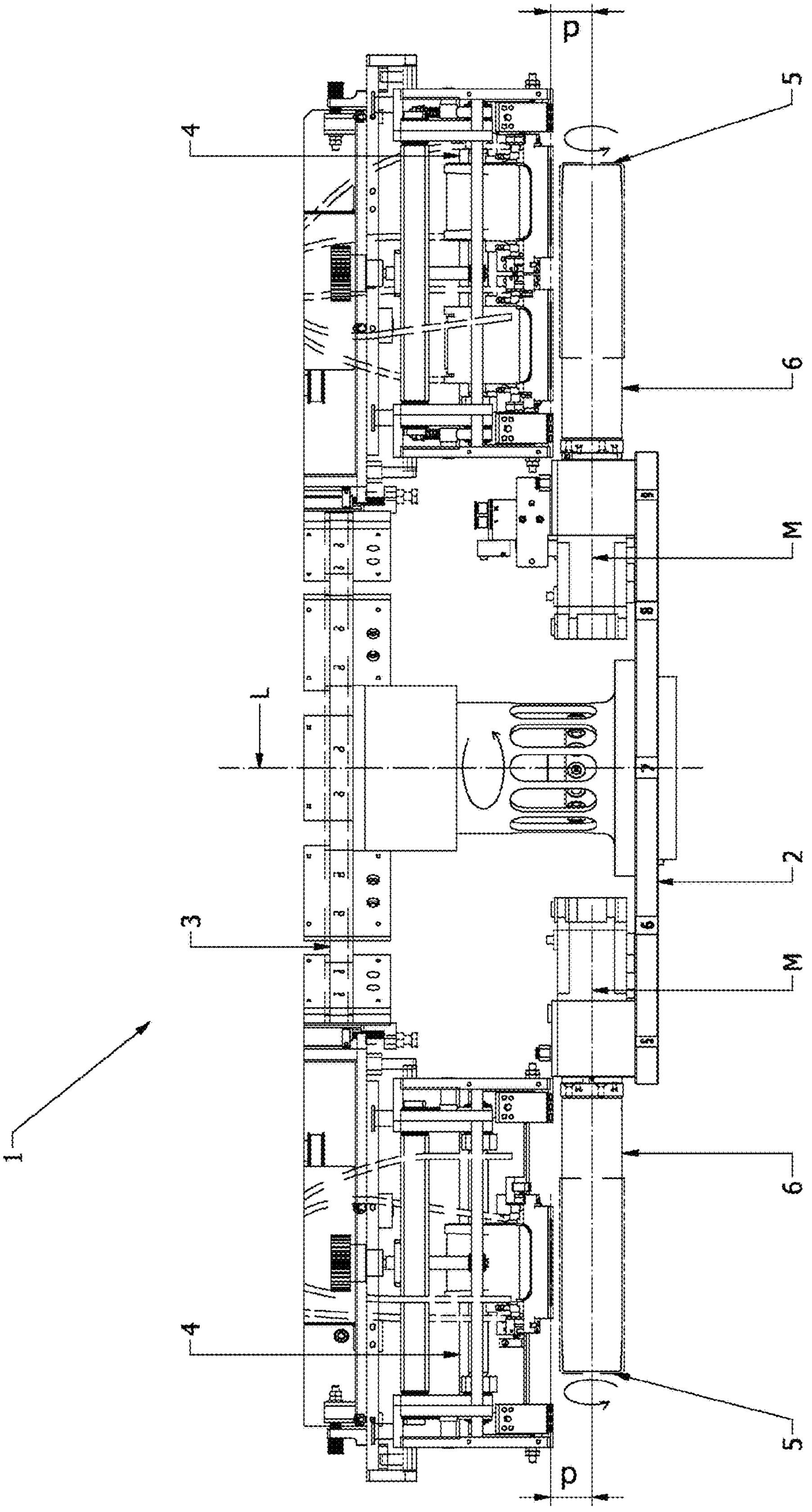
FIG. 1 shows a schematic lateral elevation view of the printing machine.
Figure 2:
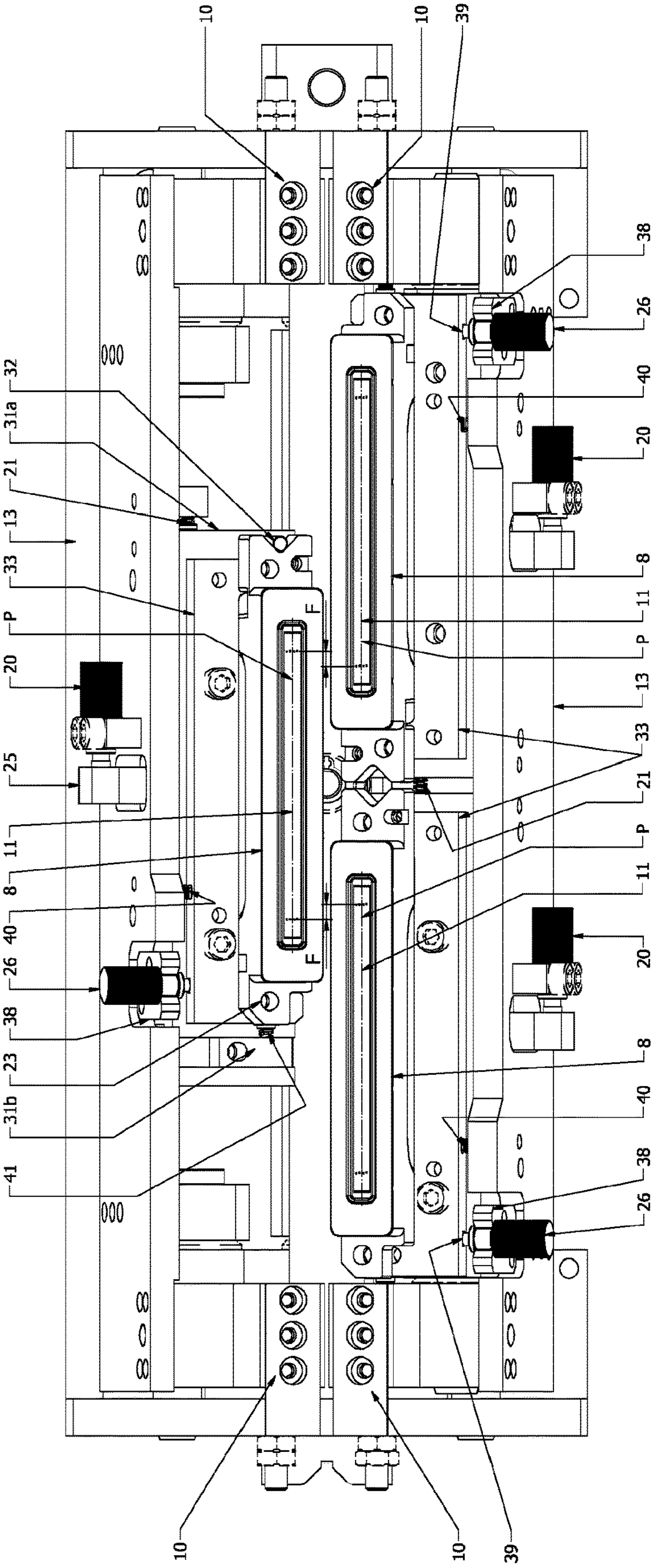
FIG. 2 shows a plan view from below of a printing station.
Figure 3:
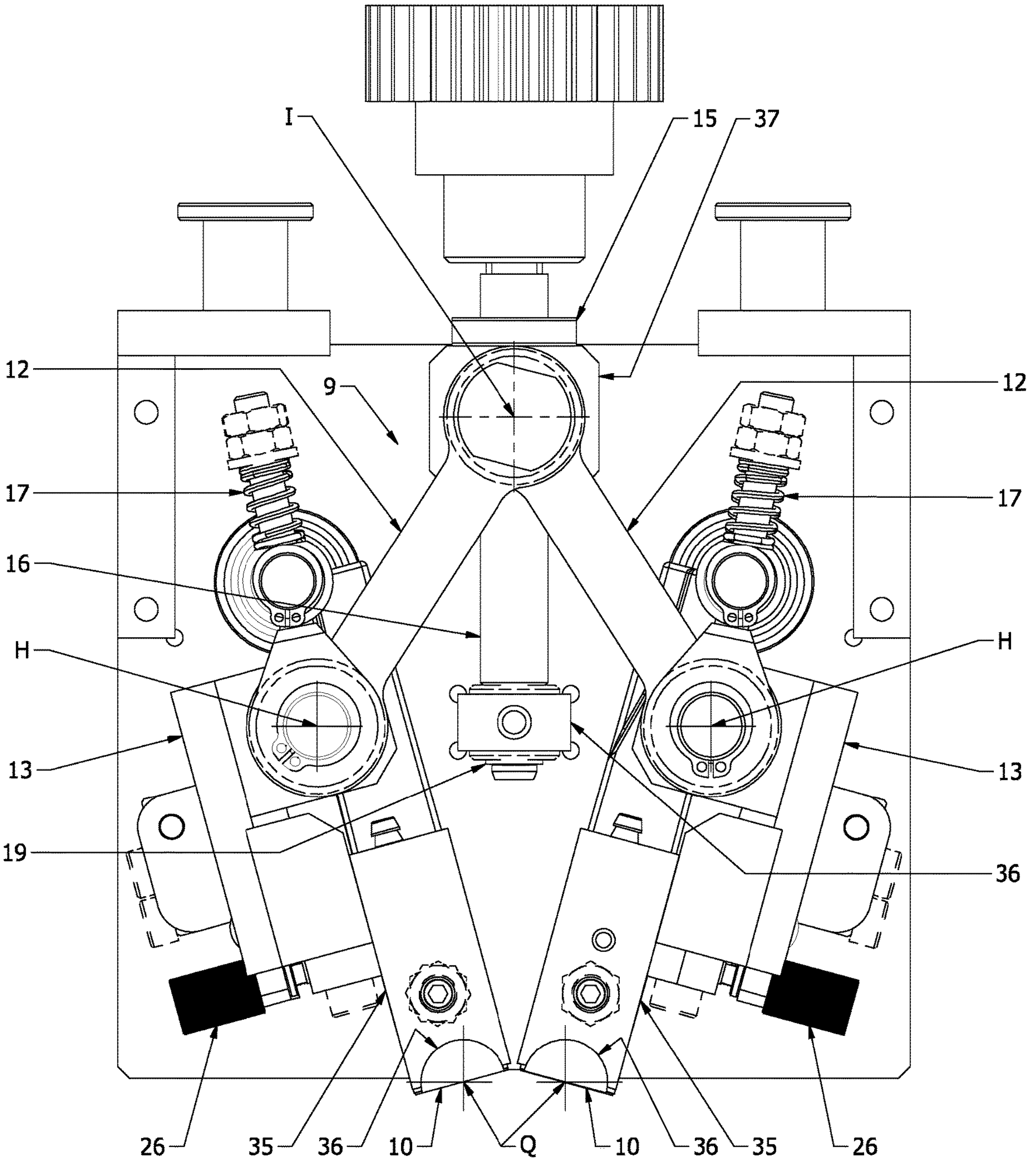
FIG. 3 shows a view of a printing station in the radial direction with respect to the rotation axis of the table.
Figure 4:
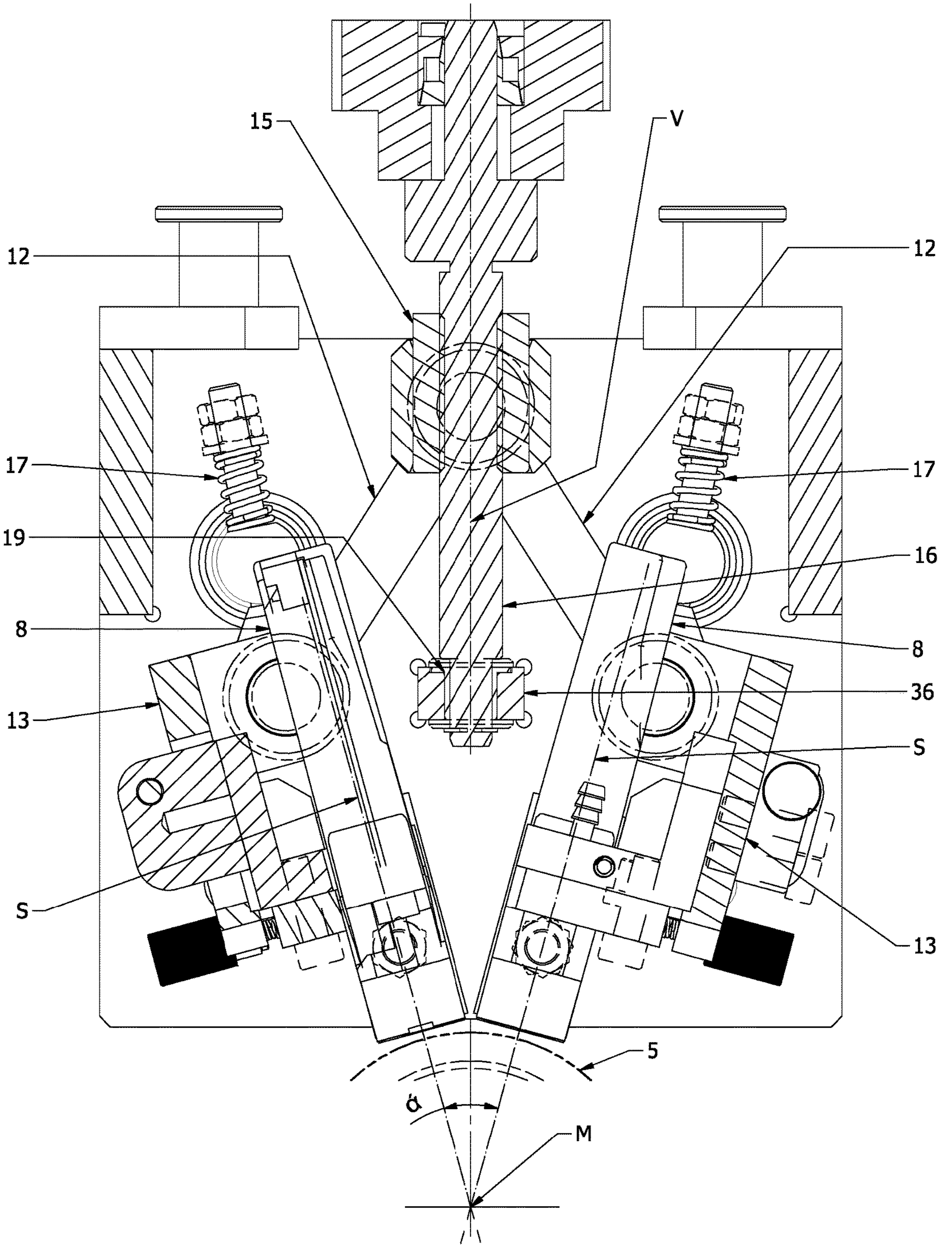
FIG. 4 shows the same view as FIG. 3 but in vertical section, where the cylindrical generatrices of the cylindrical printing substrate have been added in a schematic manner.
Figure 5:
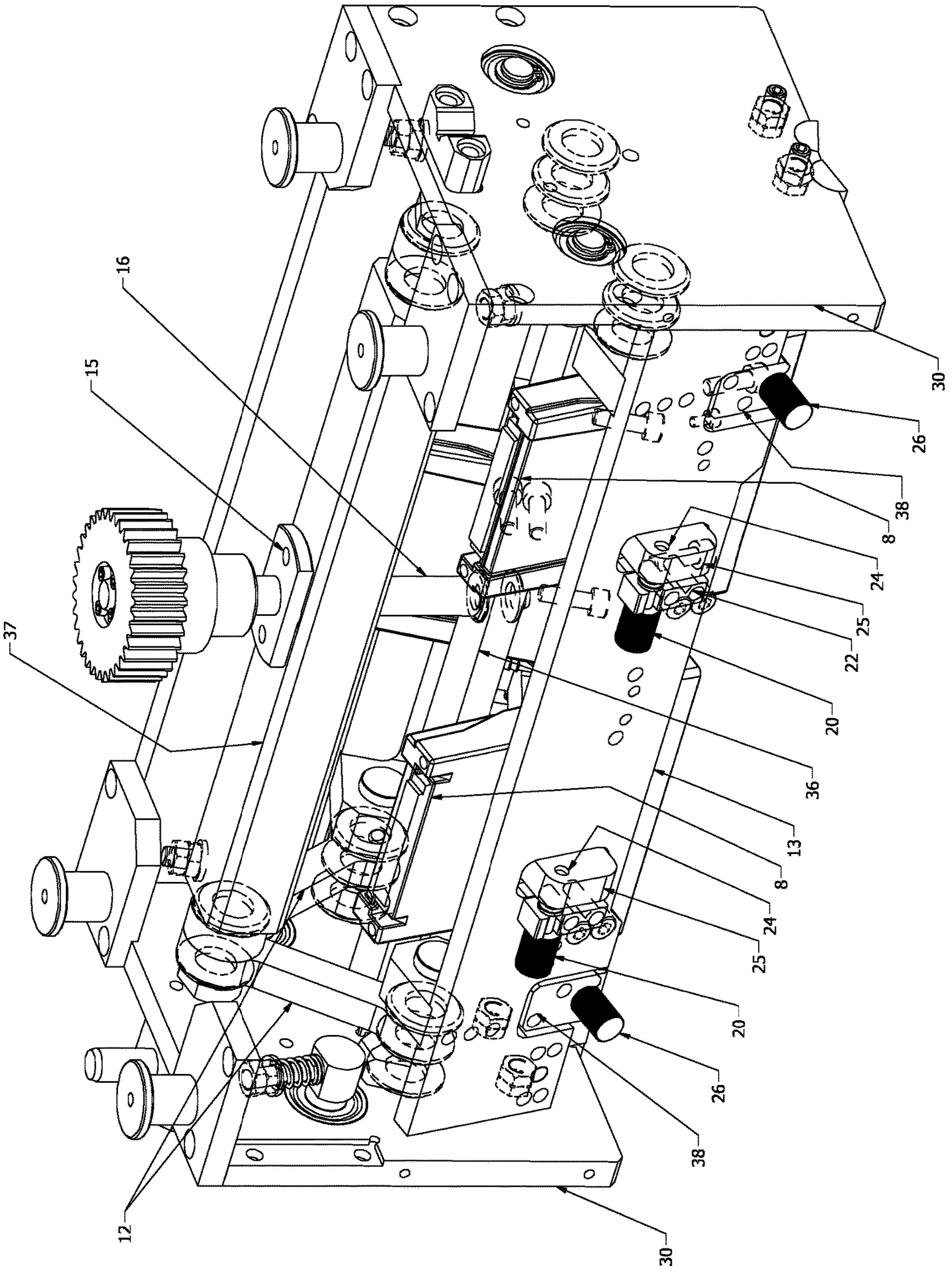
FIG. 5 shows a partially exploded axonometric view of the printing station from the side where two printheads are provided.
Figure 6:
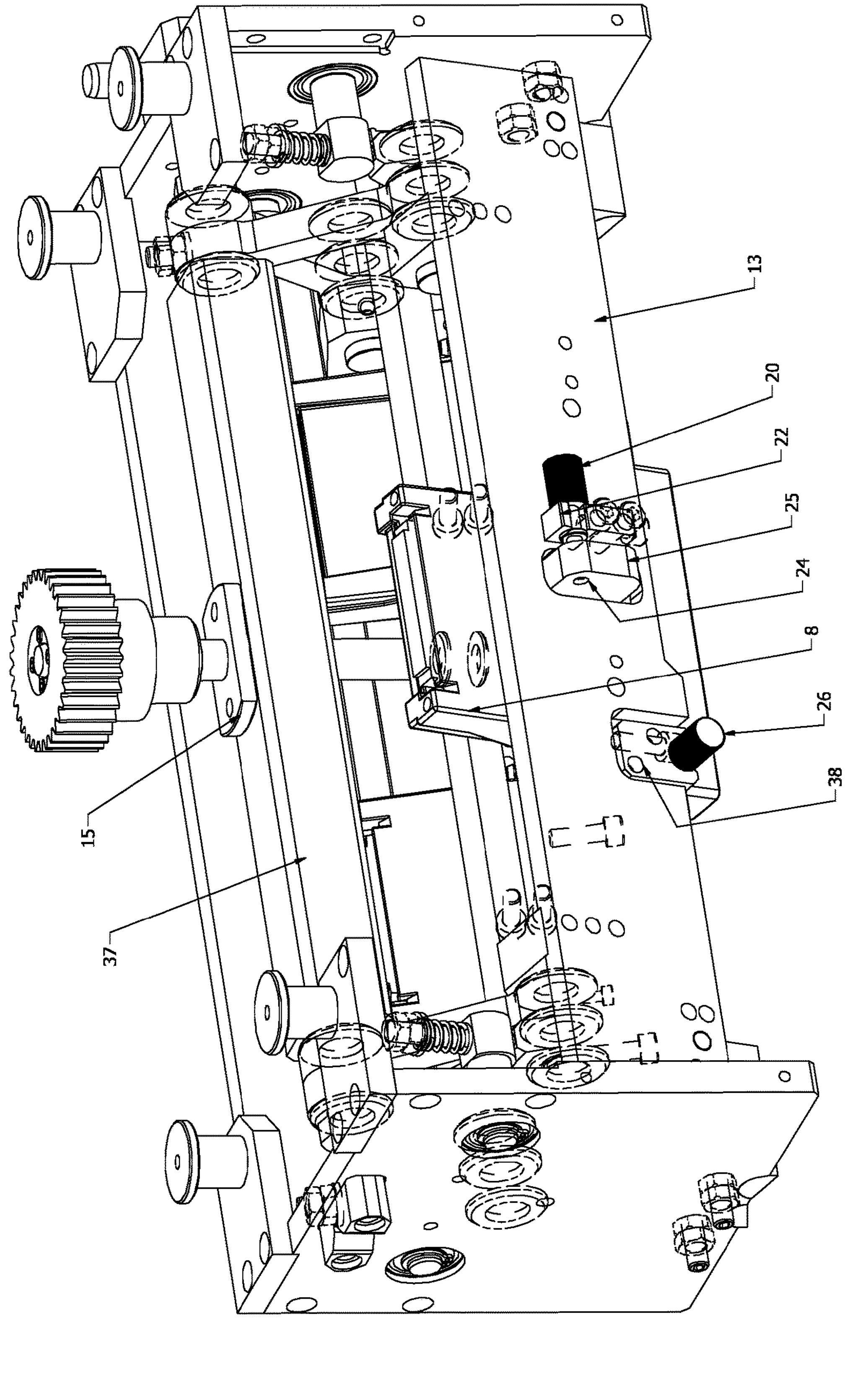
FIG. 6 shows a partially exploded axonometric view of the printing station from the side where a printhead is provided.

With reference to the figures mentioned, a digital inkjet printing machine for printing on cylindrical substrates is shown, indicated overall with the reference number 1.

The cylindrical substrates 5 can be intended for various purposes, e.g., food cans or deodorant spray cans, detergents, etc.

The machine 1 comprises a printing unit 3 comprising one or preferably more printing stations 4 extending longitudinally and a rotary conveyor table 2 for sequentially conveying cylindrical substrates 5 through the printing stations 5.

The table 2 has a vertical rotation axis L and supports one or more spindles 6 for supporting the cylindrical substrates 5.

The spindles 6 are positioned at a defined angular spacing pitch, particularly constant, about the vertical rotation axis L of the table 2.

Each spindle 6 has an axis M oriented radially with respect to the vertical rotation axis L of the table 2 and is actuatable in rotation about its axis M by a special motorization not shown.

Each spindle 6 has an internal suction to retain the cylindrical substrate 5 coaxially to the spindle 6.

The printing unit 3 has printing stations 4 above the rotary table 2.

The printing stations 4 are positioned at a defined angular spacing pitch about the vertical rotation axis L of the table 2, in particular equal to or a multiple of the angular spacing pitch of the spindles 6.

Each printing station 4 is equipped with a series of printheads 8 having a parallel longitudinal axis P.

The term "longitudinal" is to be understood, also hereinafter, in the direction of longitudinal extension of the printing station 4.

The table 2 is actuatable in step-by-step rotation by a special motorization not shown for the sequential transfer and stopping of the spindles 6 with the cylindrical substrates 5 below the printheads 8 of the printing stations 4.

Each spindle 6, and consequently each cylindrical substrate 5, has its axis M parallel to the longitudinal axis P of the printheads 8 of the printing station 4 at which it is stopped.

Advantageously, each spindle 6, and consequently each cylindrical substrate 5, has an axis M belonging to the main planes S in which the printheads 8 lie of the printing station 4 at which it is stopped.

The main lying plane S, referring to the substantially parallelepiped-shaped printhead 8 illustrated, corresponds to the center plane parallel to the two lateral longitudinal surfaces.

In a printhead 8 of this shape, the lower longitudinal surface is equipped with one or more parallel longitudinal rows of firing nozzles.

Advantageously, each spindle 6, and consequently each cylindrical substrate 5, has an axis M equidistant from the printheads 8 of the printing station 4 at which it is stopped.

The machine 1 provides a first adjustment means for adjusting the distance d between the axis M of the spindle 6 and the printheads 8 of the printing station 4 at which it is stopped.

In practice, an actuator not shown capable of raising or lowering the printing unit 3 is provided for adjusting the distanced of the printheads 8 of the printing stations 4 from the horizontal plane containing the axis M of the spindles 6/cylindrical substrates 5 in a coordinated manner.

Each printing station 4 also supports a second adjustment means for adjusting the orientation of the main planes S in which the printheads 8 lie.

The second adjustment means is configured to maintain the condition of belonging of the axis M of the spindle 6 to the main planes S in which the printheads 8 of the printing station 4 lie, at which it is stopped as the distance d between the axis M of the spindle 6 and said printheads 8 vanes.

The longitudinal dimension of the printing station 4 must be such that it fits the axial length of the cylindrical printing substrates 5.

For this reason, although the solution shown merely by way of example provides three printheads 8 per printing station 4 the number of printheads 8 per printing station 4 can vary from a minimum of two printheads 8.

In any event, in each printing station 4 the printheads 8 must have a section F of overlap in the direction of their longitudinal axis P.

In order to ensure the partial overlap and at the same time the above-described orientation of their main lying plane S, the adjacent printheads 8 have an offset angle α of their main lying plane S with respect to the axis M of the spindle 6. Thus, two rows of printheads 8 are delineated, where the printheads 8 of each row share the main lying plane S.

The printing station 4 has a frame 30, 36 for supporting the two rows of printheads 8.

Each row of printheads 8 is supported by a corresponding support structure 13, 23, 31.

Each support structure 13, 23, 31 comprises a longitudinal plate 13 and, for each printhead 8, an angular support 31*a*, 31*b* in turn supporting a cradle 23 for housing the printhead 8.

Each angular support 31*a*, 31*b* is independently supported by the longitudinal plate 13 in a linearly adjustable position along the longitudinal plate 13 itself.

Each angular support 31*a*, 31*b* in turn supports the cradle 23, and the printhead 8 fixed therein, in an angularly adjustable position about a pin 32.

Each angular support 31*a*, 31*b* has a base 31*a* and a shoulder 31*b*.

More precisely, the cradle 23 is fixed to a base 33 resting against the base 31*a* of the angular support 31*a*, 31*b*.

The second adjustment means comprises a toggle system 9.

The toggle system 9 can be actuated to impose a coordinated rotation of the two rows of printheads 8 about a respective pivot 10.

For each row of printheads 8, the corresponding pivot 10 is positioned at the lower end 11 of the printheads 8 and defines a rotation axis Q parallel to the axis M of the spindle 6.

On the pivots 10, consisting of pins with a crescent-shaped cross-section, end blocks 36 of the longitudinal plates 13 are engaged.

In particular, the end blocks 36 have special engagement seats 36 conjugated to the pivots 10 on their peripheral edge.

The toggle system 9 has symmetrical connecting rods 12 each of which has its lower end hinged to the longitudinal plate 13 of a corresponding support structure 13, 23, 31*a*, 31*b*.

The upper end of each connecting rod 12 is instead operatively connected to a screw nut 15 engaged so as to slide along a screw 16 having a vertical axis V which intercepts the axis M of the spindle 6.

More precisely, a longitudinal bar 37 is centrally fixed to the screw nut 15, which has hinges to the connecting rods 12 at the opposite ends.

The lower H and upper I hinge axes of the connecting rods 12 are in turn parallel to the axis M of the spindle 6.

The screw 16 is supported in a special housing 19 fixed to a longitudinal bar 36 of the frame 30, 36.

In practice, the screw 16 can rotate on itself without translating in order to drag the screw nut 15 upwards and downwards and thus activate the toggle 9.

Elastic pushing means is provided to maintain the rotation of the two rows of printheads 8 around their respective pivots 10 when the toggle 9 is actuated.

The elastic pushing means comprises symmetrical springs 17 configured and arranged to exert a thrust in an oblique downwards direction at the lower hinges of the connecting rods 12.

Advantageously, each printing station 4 comprises a fine adjustment means for adjusting the reciprocal position of the printheads 8.

The fine adjustment means comprises the first fine adjustment means of the section of overlap F between the printheads 8.

The first fine adjustment means comprises, for each printhead 8, a micrometric screw 20 counteracted by a spring 21 for eliminating the play of the thread of the micrometric screw 20.

The micrometric screw 20 is supported in a housing 22 fixed to the longitudinal plate 13 and engages a threaded hole 24 present in a flange 25 fixed to the base 31*a* of the angular plate 31*a*, 31*b*.

For the adjustment, the angular plate 31*a*, 31*b* and therewith the cradle 23 housing the printhead 8 are moved along the longitudinal plate 13 by actuating the micrometric screw 20.

The fine adjustment means further comprises a second fine adjustment means for adjusting the reciprocal alignment between the longitudinal axes P of the printheads 8.

Also in this case, the second adjustment means comprises, for each printhead 8, a micrometric screw 26 counteracted by a spring 40 for eliminating the play of the thread of the micrometric screw 26.

The micrometric screw 26 is supported in a housing 38 fixed to the base 31*a* of the angular plate 31*a*, 31*b* and engages a threaded hole 39 present in the base 33 of the cradle 23.

The micrometric screw 26 rotates the cradle 23 about the pin 32 and the rotation of the cradle 23 is counteracted by a spring 41 supported by the shoulder 31*b* of the angular support 31*a*, 31*b* and resting against the cradle 23.

The spring 41 slides on the cradle 23 allowing the latter to rotate but remains under tension so as to block the angle of rotation achieved by the cradle 23 following the actuation of the micrometric screw 26.

Each printing station 4 is arranged to dispense ink in a Single color. The printing process takes place as follows.

The adjustments are made before starting the printing process.

The first adjustment is related to the format of the cylindrical substrates 5 to be printed.

If the external diameter of the batch of cylindrical substrates 5 to be printed is larger than that of the batch just printed, the printing unit 3 must be moved away from the table 2 to allow the cylindrical substrates 5 to be correctly positioned below the printheads 8 of each printing station 4, vice versa if the external diameter is smaller.

At this point, the toggle 9 is actuated at each printing station 4 to reorient the planes S in which the printheads 8 lie so that the axis M of the spindle 6, i.e., the axis of the cylindrical substrate 5, returns to the main plane S in which the printheads 8 lie.

Before starting the printing process, the printheads 8 of each printing station 4 are also adjusted by means of the micrometric screws 20, 26 which adjust the section of overlap F between the printheads 8 and respectively the alignment of their longitudinal axis P in a direction parallel to the axis M of the spindle 6.

In particular, the section of overlap F must be such that it overlaps one or more of the firing nozzles provided in the adjacent printheads 8.

Once the adjustments have been completed, the table 2 is actuated, to whose spindles 6 the cylindrical substrates 5 are supplied by a loader not shown.

The table 2 is actuated in step-by-step rotation, and at each advancement step it sequentially positions the cylindrical substrates 5 below the subsequent printing stations 4.

At each step, the table 2 stops for the time needed to print the cylindrical substrates 5.

With the table 2 stopped, the spindles 6 are rotated on their axis M to print the external lateral surface of the cylindrical substrates 5.

During the rotation of the spindles 6 in each printing station 4 an ink is dispensed in a single passage.

Each printing station 4 is dedicated to the application of a single ink of a different color from that used in the other printing stations 4.

In four-color printing, for example, there are four printing stations 4, one for cyan, one for magenta, one for yellow and one for black.

The process is electronically controlled for the perfect adjustment of the printing.

The digital inkjet printing machine for printing on cylindrical substrates as conceived herein is susceptible to many modifications and variations, all falling within the scope of the inventive concept; furthermore, all the details are replaceable by technically equivalent elements.

In practice, the materials used, as well as the dimensions, can be any according to the needs and the state of the art.

The invention claimed is:

1. A digital inkjet printing machine for printing on cylindrical substrates, comprising a conveyor table conveying at least one cylindrical substrate and at least one printing station equipped with a series of printheads having a parallel longitudinal axis, the series of printheads supported by a support structure, the support structure comprising a longitudinal plate, each print head of the series of printheads having a cradle housing supported by an angular support, wherein each angular support is supported by the longitudinal plate in a position that is linearly adjustable along the longitudinal plate itself, and in tum supports the cradle in an angularly adjustable position, and a toggle system having symmetrical connecting rods, each connecting rode having a lower end hinged to the longitudinal plate of the support structure and an upper end operatively connected to a screw nut engaged so as to travel along a screw having a vertical axis which intercepts the axis of the spindle, wherein said table has a vertical rotation axis and supports at least one spindle supporting said cylindrical substrate, wherein said spindle has an axis oriented radially relative to said vertical rotation axis, wherein said spindle is actuatable in rotation about its axis, wherein said conveyor table is configured to stop said spindle below said printheads, wherein said spindle stopped below said printheads has its axis parallel to the longitudinal axis of said printheads, wherein the axis of the spindle stopped below said printheads is coplanar with main planes in which said printheads lie, wherein said printheads are equidistant from the axis of said spindle, wherein there is provided a first adjustment setting adjusting the distance between the axis of the spindle and said printheads and at least a second adjustment setting adjusting the orientation of said main planes in which said printheads lie, said second adjustment setting configured to maintain the condition of the axis of the spindle stopped below said printheads being coplanar with the main planes in which said printheads lie as the distance between the axis of the spindle and said printheads varies.

2. The digital inkjet printing machine for printing on cylindrical substrates according to claim 1, comprising said printheads comprise a section of overlap in the direction of their longitudinal axis.

3. The digital inkjet printing machine for printing on cylindrical substrates according to claim 1, comprising a plurality of printing stations, each equipped with a series of printheads, in that said table is configured for step-by-step rotation and supports a plurality of angularly equally spaced spindles, in that said printing stations are arranged angularly equally spaced around said table, and in that each spindle is sequentially stoppable below the printheads of the printing stations.

4. The digital inkjet printing machine for printing on cylindrical substrates according to claim 1, comprising a printing station with two rows of printheads lying in different main planes.

5. The digital inkjet printing machine for printing on cylindrical substrates according to claim 4, said second adjustment setting comprises a second toggle system for coordinated actuation in rotation of said two rows of printheads around a respective pivot.

6. The digital inkjet printing machine for printing on cylindrical substrates according to claim 4, comprising an elastic push pushing said two rows of printheads against the respective rotation pivot.

7. The digital inkjet printing machine for printing on cylindrical substrates according to claim 6, comprising a fine adjustment setting finely adjusting the reciprocal position of the printheads.

8. The digital inkjet printing machine for printing on cylindrical substrates according to claim 7, wherein said fine adjustment setting finely adjusting said section of overlap.

9. The digital inkjet printing machine for printing on cylindrical substrates according to claim 8, comprising a second finely adjusting setting, setting the reciprocal alignment between the longitudinal axes of the printheads.

10. The digital inkjet printing machine for printing on cylindrical substrates according to claim 9, comprising a fine adjustment means which comprises at least one micrometric screw opposed by a spring for eliminating the play of the thread of the micrometric screw.

11. A method for printing on cylindrical substrates with a digital inkjet printing machine in accordance with claim 1, comprising providing each printing station with a number of printheads that is at least sufficient for them to overlap without interruptions over the entire axial length of the cylindrical substrates to be printed on, mounting the cylindrical substrates on the spindles, actuating, in step-by-step rotation, the table conveying the cylindrical substrates in sequence below the printing stations, actuating, while the cylindrical substrates are stopped below the printing stations, the spindles in rotation around themselves and during the rotation of the spindles around themselves, delivering an ink with a single pass.

12. A method for printing on cylindrical substrates according to claim 11, comprising that an ink of a different color is applied at every workstation.

* * * * *